Sept. 13, 1949. S. HILLER, JR 2,481,747
HELICOPTER
Filed March 27, 1946 3 Sheets-Sheet 1
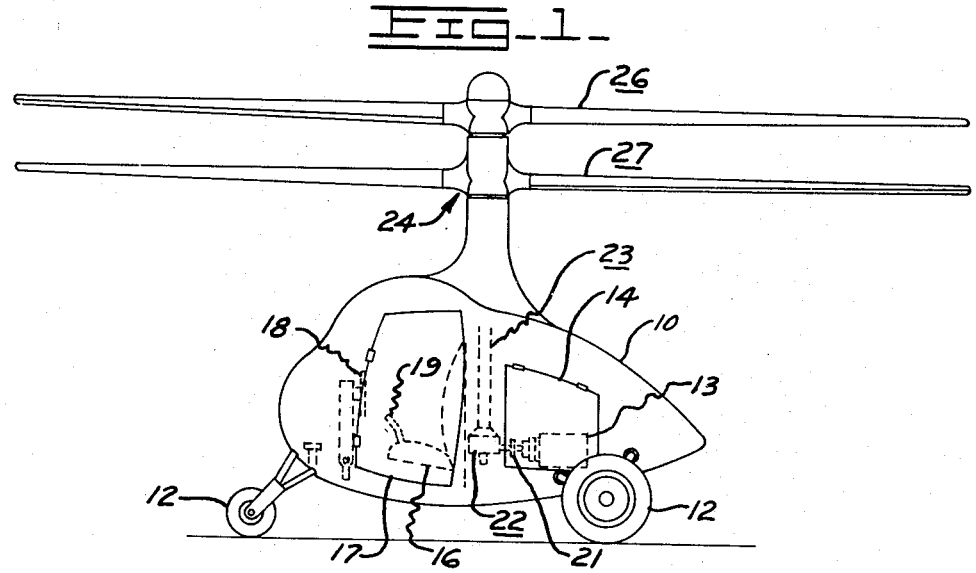
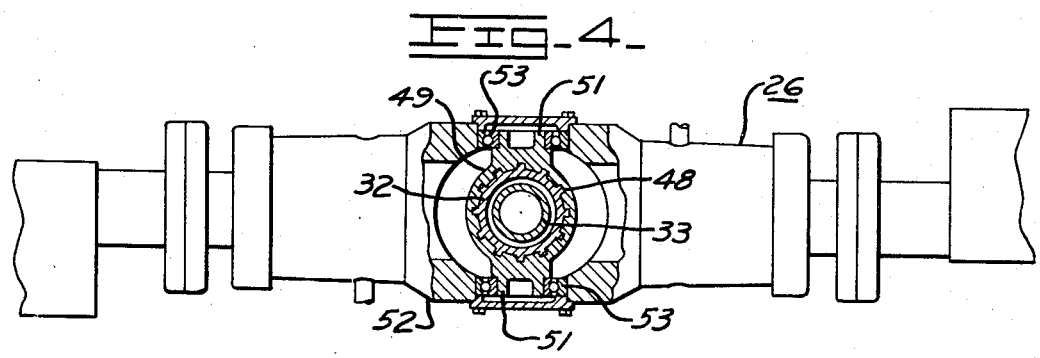
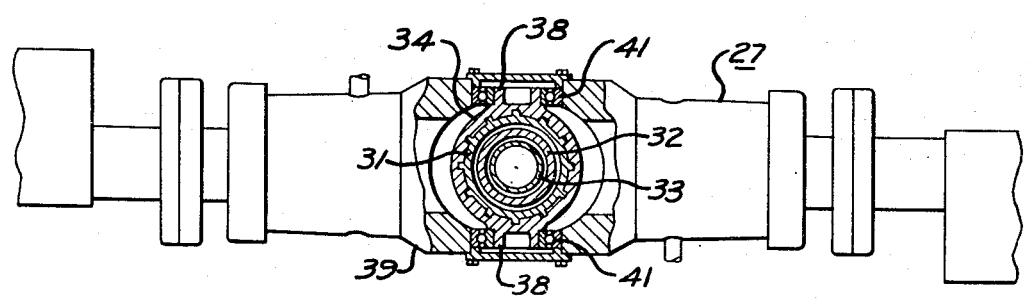
INVENTOR.
STANLEY HILLER JR.
BY

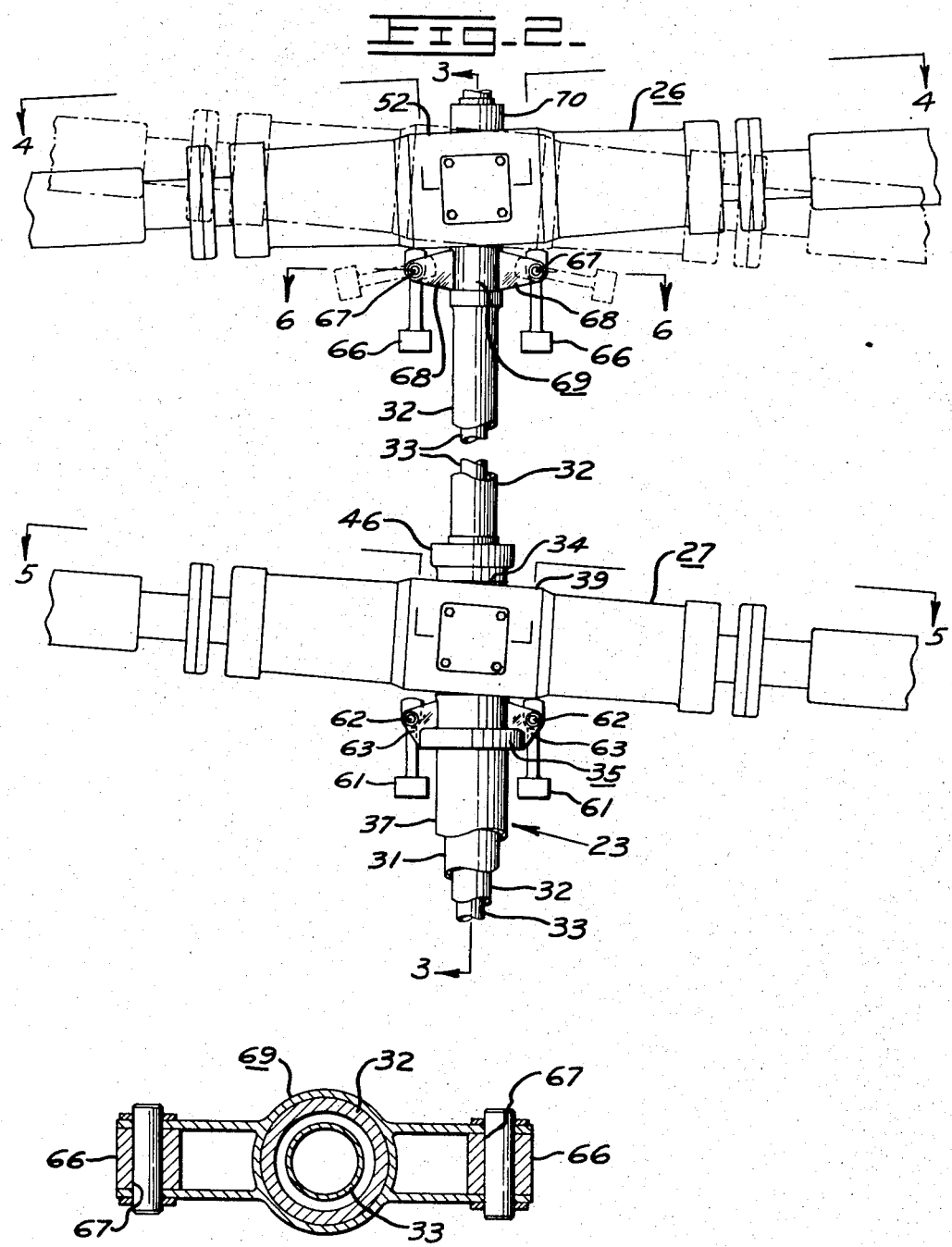

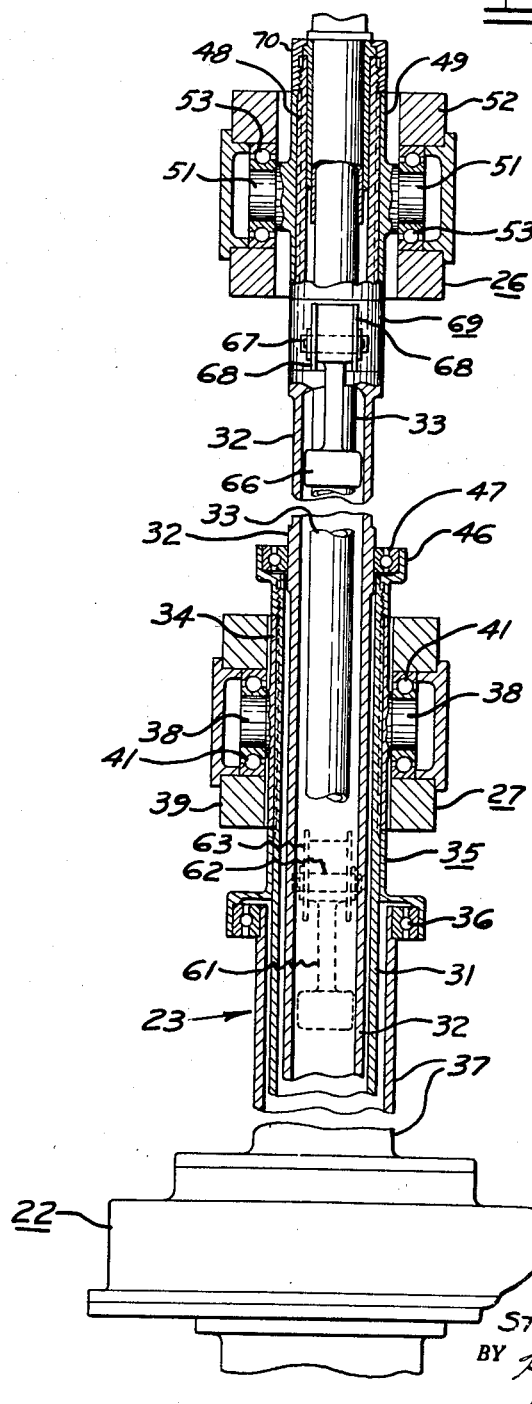

Patented Sept. 13, 1949

2,481,747

UNITED STATES PATENT OFFICE 2,481,747

HELICOPTER

Stanley Hiller, Jr., Berkeley, Calif., assignor to United Helicopters, Inc., Palo Alto, Calif., a corporation of California Application March 27, 1946, Serial No. 657,373

3 Claims. (Cl. 170—160.55)

This invention relates to helicopters and is concerned more particularly with the helicopters having a plurality of contra-rotating wing structures.

In helicopters provided with two or more wing structures which rotate in opposite directions and which are pivoted about respective axes transverse to the driving axes thereof, the wings vary their angular positions relative to their respective driving axes during a revolution due to aerodynamic forces and the control of the wings in maneuvering the helicopter. The desired extent of angular pivoting movement of the respective wings is such that there is a possibility of collision when the wings are angled oppositely to each other. During normal flight operation the aerodynamic forces involved maintain the wings spaced apart so that there is no possibility of a collision. However, when driving of the wings is discontinued and their speed of rotation decreases sufficiently that aerodynamic forces are no longer in control to maintain a non-interfering position of the wings, there exists the possibility of a collision between adjacent wings which would result in severe damage.

The instant invention is concerned with the elimination of the possibility of collision between adjacent oppositely rotating wings of a helicopter when their speed of rotation falls below the stability range involved in normal operations and provides for automatic limiting of the degree of angular movement permitted to the respective wings in accordance with their speeds of rotation.

It is a general object of the invention therefore, to provide an improved helicopter of the plural contra-rotating wing type in which the possibility of collision between the wings is eliminated.

Another object of the invention is to provide a helicopter of the above type in which automatic limit stops are provided to control the degree of angularity of the wings with respect to their respective driving axes.

A further object of the invention is to provide centrifugally operable automatic control means for limiting the angularity of the wings of helicopters of the above type.

Other objects and advantages of the invention will be apparent from the following description of a preferred embodiment of the invention, as illustrated in the accompanying drawings, in which:

Figure 1 is a somewhat schematic side elevational view of a helicopter embodying the invention.

Figure 2 is a fragmentary elevational view of the operative parts of the driving head and wing structures of a helicopter embodying the instant invention.

Figure 3 is a vertical sectional view through the driving head structure of a helicopter taken in a plane indicated by the line 3—3 in Figure 2.

Figure 4 is a fragmentary view of the drive connection of the upper wing structure taken as indicated by the line 4—4 in Figure 2.

Figure 5 is a view similar to Figure 4 of the lower wing structure and is taken as indicated by the line 5—5 in Figure 2.

Figure 6 is a horizontal sectional view taken on the line 6—6 of Figure 2.

As previously stated, the present invention is concerned with helicopters of the type employing a plurality of contra-rotating wings and provided with automatic speed responsive control means so that in the lower speed ranges of the wings an automatic control is provided to eliminate the possibility of a collision between adjacent oppositely rotating wings. The invention is illustrated in conjunction with a helicopter having a pair of oppositely rotating wings, although of course the invention is equally applicable to a helicopter having any desired number of contra-rotating wing structures.

Referring to Figure 1, the helicopter may comprise a body 10 having a suitable form of landing gear 12 thereon. The wheel type of landing gear shown is merely illustrative. Within the body 10 there is provided a power plant 13 to which access may be had through a door 14. Forwardly of the power plant 13 there is provided a seat 16 to which access may be had through a door 17. Various operating controls of the helicopter are shown in the pilot's compartment including a wheel 18 and a control post 19. The drive from the power plant 13 may be transmitted through a suitable form of clutch 21 and a gear box 22 through a vertically extending shaft structure 23 forming a part of a drive head structure indicated generally at 24 which carries and drives the respective upper and lower wing structures 26 and 27.

Referring to Figure 3 of the drawings, the drive head structure of the helicopter may comprise an outer tubular drive shaft 31 for the lower wing structure 27 and an inner tubular drive shaft 32 for the upper wing structure 26 through which a conventional form of control rod 33 may extend. The tubular shaft 31 (Figures 3 and 5) has a splined drive connection with a drive hub or sleeve 34. The lower end of the drive hub 34 abuts the upper end of a sleeve or support bracket 35 which has a press-fit on the shaft 31 and is supported by a bearing 36 on a tubular housing member 37 extending upwardly from the gear box 22. At its upper end, the drive shaft 31 is threaded to receive a bearing retainer 46 which with the bracket 35 serves to hold the drive hub 34 in the desired axial position on the shaft 31. The drive hub 34 carries respective integrally formed trunnions 38 upon which the central support hub 39 of the wing structure 27 is journaled by means of bearings 41 for pivotal movement of the wing structure in the usual fashion.

The bearing retainer 46 (Figure 3) houses a bearing 47 which provides a journaled connection between the drive shafts 31 and 32 and the drive shaft 32 extends upwardly beyond this journaled connection and has a splined drive connection at 48 (Figures 3 and 4) with a drive hub or sleeve 49 for the upper wing structure. The sleeve 49 carries respective trunnions 51 upon which the support hub 52 of the upper wing structure is pivotally mounted by respective bearings 53.

As previously stated, during normal flight operation of a helicopter or during power driving of the respective wing structures, the wings are rotating in a speed range such that the aerodynamic forces involved provide for stability of these wing structures in their pivoting movement so that there will be no collision between adjacent wings by virtue of their opposite directions of rotation. In order to prevent such collisions when the drive of the wings is interrupted, automatic speed responsive limit stops are provided which are inoperative during power driving of the wing structures but which become operative in the lower speed ranges involved when power driving is discontinued.

Referring to Figures 2 and 3, the limit stops with respect to the lower wing structure 27 may comprise a pair of oppositely disposed governor fly-weights or pendulum-type levers 61 which are pivotally mounted at 62 in respective pairs of ears 63 integrally formed with the mounting bracket 35. The upper ends of the respective governor elements 61 are disposed immediately below opposite portions of the support hub 39 for the lower wing structure 27 in alignment with the longitudinal axis of the wing structure. The mounting of the governor fly-weights on bracket 35 causes the fly-weights to rotate in unison with the wing structure so as to be responsive to the rate of rotation thereof.

Similarly, respective limit stops in the form of governor fly-weight elements or levers 66 (Figures 2 and 3) are provided for the upper wing structure which are pivotally mounted at 67 in respective pairs of ears 68 of a mounting bracket 69. The mounting bracket or sleeve 69 is clamped on the inner tubular drive shaft 32 between a shoulder of the shaft 32 and the drive hub 49 by a nut 70 threaded on the upper end of the shaft 32 and abutting the upper end of the drive hub 49.

The length of the short upper arms of the respective governor elements 61 and 66 is such that with the governor elements hanging idle in their gravity-responsive positions, as shown in full lines in Figure 2, the arcuate upper ends of the governor elements 61 and 66 are presented as stops to the respective support hubs 39 and 52 of the wings so that the pivotal movement of the respective wing structures 26 and 27 about the pivotal supports is limited to an amount insufficient to allow a collision between the wing structures. Because of the arcuate shape of the upper ends of the governor or stop elements 61 and 66 which is preferably concentric with respect to their pivotal axes, the stops remain effective during a selected amount of pivotal movement of the stop elements.

However, during normal flight operations, it is desirable for control of the helicopter to allow a greater extent of pivotal movement of the wing structures and during such rotation, the governor elements (66, for example) fly outwardly to the position shown in dotted lines in Figure 2 where their upper ends are withdrawn from their position as limit stops to allow the desired extent of pivoting movement of the respective wing structures.

While a presently preferred embodiment of the invention has been shown and described, it will be obvious that the invention can be embodied in other forms and the scope therefore should be limited only by the scope of the claims appended hereto.

I claim:

1. In a rotary wing aircraft, an upright wing structure supporting shaft, a wing structure mounted on said shaft for rotation about the axis of said shaft and for flapping movement about a generally horizontal axis transverse to said shaft axis, a bracket member below said wing structure mounted for rotation with said wing structure about the axis of said shaft and having a laterally extending ear member, and a pendulum type stop member freely pivoted in said ear member intermediate its ends to thus provide in the stop operative position thereof an upwardly extending arm portion and a downwardly extending flyweight arm portion which is outwardly swingable under the action of centrifugal force, the upper end of said upwardly extending arm portion providing said stop adapted to engage the underside of said wing structure for limiting downward flapping of said wing structure.

2. In a rotary wing aircraft, an upright wing structure supporting shaft, a wing structure mounted on said shaft for rotation about the axis of said shaft and for flapping movement about a generally horizontal axis transverse to said shaft axis, a bracket member below said wing structure mounted for rotation with said wing structure about the axis of said shaft and having a laterally extending ear member, and a pendulum type stop member freely pivoted in said ear member intermediate its ends to thus provide in the stop operative position thereof an upwardly extending arm portion and a downwardly extending flyweight arm portion which is outwardly swingable under the action of centrifugal force, the upper end of said upwardly extending arm portion providing said stop adapted to engage the underside of said wing structure for limiting downward flapping of said wing structure, and said downwardly extending arm portion being longer than said upwardly extending arm portion.

3. In a rotary wing aircraft, an upright wing structure supporting shaft, a wing structure mounted on said shaft for rotation about the axis of said shaft and for flapping movement about a generally horizontal axis transverse to said shaft axis, a bracket member below said wing structure mounted for rotation with said wing structure about the axis of said shaft and having a laterally extending ear member, and a pendulum type stop member freely pivoted in said ear member intermediate its ends to thus provide in the stop operative position thereof an upwardly extending arm portion and a downwardly extending flyweight arm portion which is outwardly swingable under the action of centrifugal force, the upper end of said upwardly extending arm portion having an arcuate contour concentric with the pivotal mounting axis of said stop member, and said arcuate end providing said stop adapted to engage the underside of said wing structure for limiting downward flapping of said wing structure.

STANLEY HILLER, JR.

REFERENCES CITED

The following references are of record in the file of this patent:

UNITED STATES PATENTS

| Number | Name | Date |
|---|---|---|
| 1,919,089 | Breguet et al. | July 18, 1933 |
| 2,037,745 | Vaughn | Apr. 21, 1936 |
| 2,151,215 | Larsen | Mar. 21, 1939 |
| 2,256,918 | Young | Sept. 23, 1941 |
| 2,396,038 | Bossi | Mar. 5, 1946 |